United States Patent [19]

Denz et al.

[11] Patent Number: 5,373,830
[45] Date of Patent: Dec. 20, 1994

[54] BREATHER FOR AN INTERNAL COMBUSTION ENGINE FUEL TANK

[75] Inventors: Helmut Denz, Stuttgart; Hans Neu, Vaihingen-Enz; Guenther Riehl, Buehlertal; Andreas Blumenstock, Ludwigsburg; Rainer Frank, Sachsenheim, all of Germany

[73] Assignee: Robert Bosch GmbH, Stuttgart, Germany

[21] Appl. No.: 98,346

[22] Filed: Aug. 6, 1993

[30] Foreign Application Priority Data

Dec. 6, 1991 [DE] Germany ............... 4140255

[51] Int. Cl.5 .................................. F02M 37/04
[52] U.S. Cl. ........................ 123/520; 123/519; 123/198 D
[58] Field of Search ............ 123/520, 521, 518, 516, 123/519, 198 D

[56] References Cited

U.S. PATENT DOCUMENTS

| | | | |
|---|---|---|---|
| 3,802,403 | 4/1974 | Dewick | 123/520 |
| 4,175,526 | 11/1979 | Phelan | 123/520 |
| 4,862,856 | 9/1989 | Yokoe | 123/520 |
| 5,148,793 | 9/1992 | Reddy | 123/520 |
| 5,209,210 | 5/1993 | Ikeda | 123/520 |
| 5,243,944 | 9/1993 | Plumenstock | 123/520 |
| 5,253,629 | 10/1993 | Fornoto | 123/519 |
| 5,263,462 | 11/1993 | Reddy | 123/520 |

FOREIGN PATENT DOCUMENTS

| | | | |
|---|---|---|---|
| 4043751 | 8/1981 | Germany | 123/520 |
| 3542194 | 6/1987 | Germany | 123/520 |
| 0161952 | 12/1980 | Japan | 123/519 |
| 0027865 | 2/1983 | Japan | 123/519 |
| 0255513 | 11/1987 | Japan | 123/520 |
| 4295150 | 10/1992 | Japan | 123/520 |

*Primary Examiner*—Carl S. Miller
*Attorney, Agent, or Firm*—Edwin E. Greigg; Ronald E. Greigg

[57] ABSTRACT

A breather valve for the gas tank of an internal combustion engine having an adsorption filter which is linked to the atmosphere by a breather line which is controlled by a shut-off valve. The tank breather valve is constructed so that pressure build up in the fuel tank, the lines, and the adsorption filter do not lead to damage of the valves. The magnetic circuit of the shut-off valve provides that above a predetermined pressure in the adsorption filter, the generated pressure is sufficient to open the shut-off valve, thereby facilitating pressure relief without any damage. The breather is particularly suitable for internal combustion engines in motor vehicles.

23 Claims, 2 Drawing Sheets

BREATHER FOR AN INTERNAL COMBUSTION ENGINE FUEL TANK

PRIOR ART

The invention is based on a breather for an internal combustion engine fuel tank. Such a breather with an adsorption filter, an active carbon filter for example, is known from the DE-OS 40 03 751 which prevents the escape of fuel vapours from a fuel tank into the atmosphere. The fuel vapours arise as soon as the fuel exceeds the saturation temperature which is dependent on the ambient pressure. Initially, those parts of the fuel will evaporate which have the lowest saturation temperature. With increasing fuel temperature or reducing ambient pressure, the rate of fuel evaporation increases. The fuel vapour represents a severe burden for the environment and a health hazard for people, in particular when it is inhaled.

The adsorption filter is connected to the fuel tank by means of a filter line which terminates in the interior of the adsorption filter, for example in that region which is filled with activated carbon. A suction line which is controlled by a tank breather valve, links the adsorption filter with that part of the induction manifold of the internal combustion engine which is downstream from a throttle.

With the engine running, the fuel vapour is drawn in by the vacuum which exists, in the induction manifold behind the throttle, and is fed to the engine, for combustion. At periods of rest or when the tank breather valve is closed, or when the vacuum being accumulated in the induction manifold is insufficient due to the load conditions of the engine to allow the fuel vapours to be exhausted, these are adsorbed in the adsorption filter.

The limited design space of the adsorption filter provides for a limited storage capacity. For regeneration, the adsorption filter is flushed with fresh air which is fed to the filter via a breather line which is linked to the atmosphere. With negative pressure prevailing in the suction pipe and the tank breather valve open, the fresh air will pass first through a shut-off valve, which controls the breather line, into the adsorption filter, where it absorbs the fuel vapours and feeds these through the suction line and the suction pipe to the engine.

With both the shut-off valve and the tank breather valve closed, it is required for reasons of function and environment protection, that the fuel tank, the filter line, and the adsorption filter form a single unit which is hermetically sealed from the atmosphere. To check the sealing efficiency, a negative pressure is set in this unit (see DE-OS 40 03 751). If one of the components is leaky, the negative pressure cannot be maintained, since air from the outside will flow into this unit. Following this leak diagnosis, the shut-off valve is opened, and with the tank breather valve open, fresh air will flow via the shut-off valve into the adsorption filter, regenerating the adsorption filter, and is then fed as a mixture to the engine.

With such a shut-off valve, there is the risk that condensate will accumulate in its electrical region and cause faults or failure of the shut-off valve.

Furthermore, with such a shut-off valve, there is the risk that any fault in the electromagnetic circuit will unintentionally keep the valve closed and that, with the tank breather valve closed, an inadmissibly high pressure will build up in the fuel tank, the lines, and the adsorption filter, causing faults.

The fresh air flowing into the adsorption filter contains impurities, for example in the form of dust and dirt particles. These impurities will partly deposit in the interior of the shut-off valve, for example, on the sealing faces of a valve closing body and the valve seat. When the valve closes again, the deposited impurities will prevent repeated tight closing of the shut-off valve. If the unit is to be subjected to a further leak test, air will enter into the unit from outside through the defective shut-off valve which has negative pressure. This makes it impossible to positively assess whether the leak stems from a possibly existing leak somewhere in the unit or from insufficient sealing of the shut-off valve.

In known breathing devices (U.S. Pat. Nos. 41 75 526, 48 62 856), a small particle filter is provided, extending in a radial direction, between the shut-off valve and the atmosphere, which is of very fine porous construction in order to retain even the smallest dirt particles. This results in a very high pneumatic flow resistance of the particle filter, with the disadvantage that the regenerating air flow encounters an undesirably high pressure drop at the particle filter, which causes a negative pressure in the adsorption filter. This negative pressure will also take effect in the fuel tank where it causes an unintended intensified evaporation of the fuel. A further disadvantage is the fact that during filling of the fuel tank, the vapour which has formed is pushed towards the adsorption filter, with the shut-off valve open, and that the pressure drops at the particle filter, which triggers the shut-off mechanism of the fuel hose nozzle in an undesirable manner.

ADVANTAGES OF THE INVENTION

In contrast, the breather in accordance with the invention for an internal combustion engine fuel tank has the advantage that with pressure building up due to faults in the fuel tank, the lines, and the adsorption filter, it is ensured that above a predetermined level, pressure is relieved via the shut-off valve.

The measures herein facilitate advantageous developments and improvements of the breather specified.

A larger flow cross-section of a fine porous particle filter reduces the pressure drop of the medium which flows through the particle filter and still protects the shut-off valve from dirt and dust particles. Moreover, the particle filter has a longer life due to the large surface area.

The breather line, which extends at least partially outside the adsorption filter, enables simple mounting of the shut-off valve and of the breather line. The electrical connections required for the control do not have to be routed through housing apertures which are sealed to the environment.

A further advantage is the design and arrangement of the shut-off valve in a manner which allows any condensate which forms to flow off without impairing the function of the shut-off valve.

Due to the arrangement of at least one baffle in the adsorption filter, a more intense and prolonged through-flow of the adsorption medium is made possible in an advantageous manner.

BRIEF DESCRIPTION OF THE DRAWING

Embodiment examples of the invention are shown simplified in the drawing and are mere closely explained in the description which follows.

DESCRIPTION OF THE EMBODIMENT EXAMPLES

Figure 1:
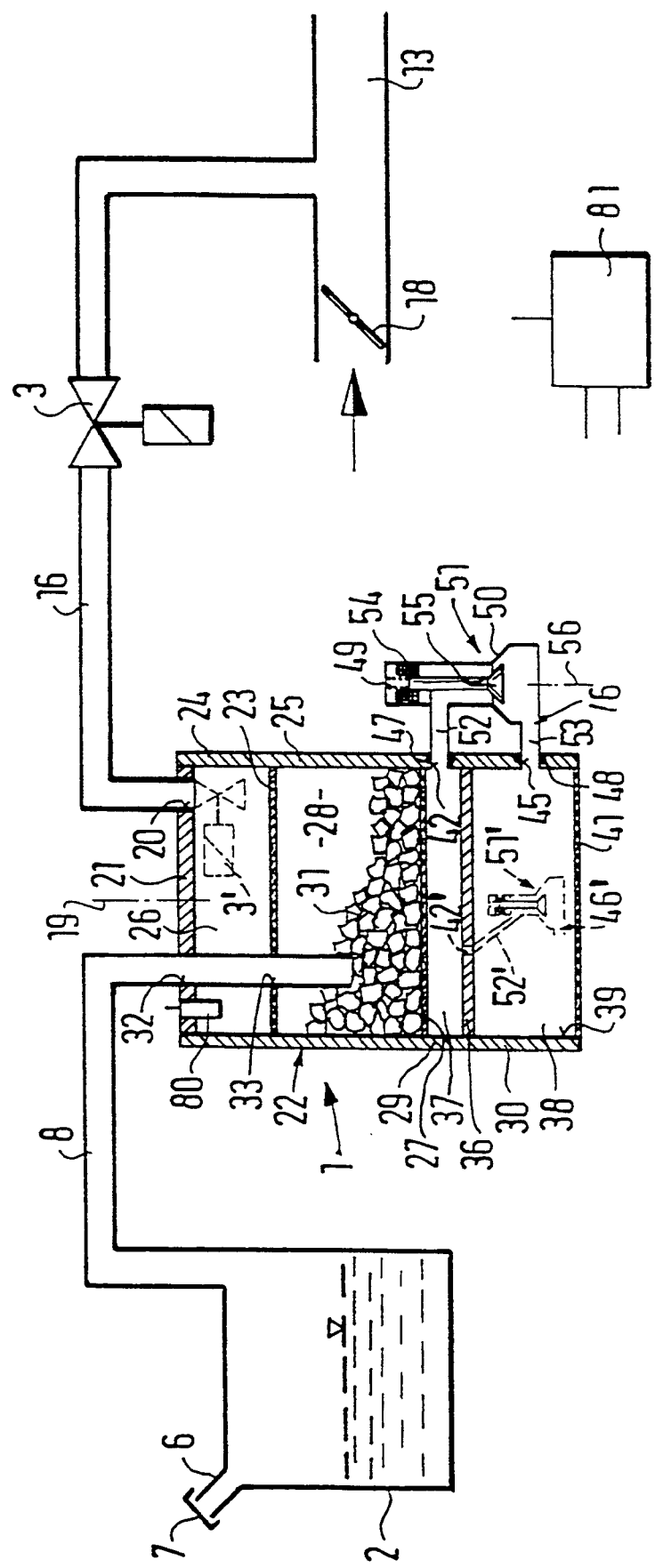
FIG. 1 shows a first example of a breather in accordance with the invention.

FIG. 1 shows a diagrammatic view of a breather of an internal combustion engine, for example for a motor vehicle. The breather includes an adsorption filter 1, a fuel tank 2, and a tank breather valve 3. The fuel tank 2 is filled via a filler neck 6 which is closed by a tank cap 7. The adsorption filter 1 and the fuel tank 2 are connected to each other via a filter line 8 which starts from a region of the fuel tank 2 in which the vapour-like proportions of the fuel will mainly collect.

At the interphase layer between the liquid and vapour-like fuel, represented by a triangle, the liquid phase changes into the vapour phase at the values which correspond to the vapour pressure curve, and enriches the space above the liquid phase with fuel vapour. A commercial fuel for a known mixture compressing, spark ignited internal combustion engine, for example, may contain proportions whose saturation temperature lies below 40° C., which therefore will have completely evaporated at a fuel temperature of 40° C. The vapour pressure of the fuel corresponds to the sum total of the partial pressures of the vapour-like proportions of the fuel. At a fuel temperature of 40° C., for example, the vapour pressure of a fuel being used for a known mixture compressing spark ignited internal combustion engine can reach values of up to 1.9 bar, i.e. above the standard pressure of approx. 1.013 bar. With a rising temperature or reducing ambient pressure, the rate of evaporation will increase up to the point where a state of equilibrium is once again achieved.

A suction line 16, which is controlled by the tank breather valve 3, links the adsorption filter 1 to an induction manifold 13 of the engine, which is not shown. The suction line 16 terminates in an induction manifold 13 in a section downstream from a throttle 18, in which negative pressure prevails, conditioned by the load.

The end of the suction line 16 which faces the adsorption filter 1 couples with a suction line connection 20 of a disc-shaped housing cover 21 which covers a corresponding cylindrical housing 22 of the adsorption filter 1 at its one end. The housing cover 21 is tightly connected to the housing 22 and the suction line 16. Inside the housing 22, a first gas permeable filter insert 23 which extends at an axial separation from the housing cover 21 and over the entire inner cross-sectional area of the housing 22 at right angles to the longitudinal axis 19 of the housing, is arranged. An annular housing section 24 of the housing 22, the housing cover 21, and the filter insert 23, define a first reservoir 26 which, by means of the suction line connection 20, is linked to the suction line 16, and, when the tank breather valve 3 is open, to the induction manifold 13.

On the face of the first filter insert 23, facing away from the housing cover 21, a second filter insert 27, at an axial separation from the first filter insert, covers the entire inner cross-section of the housing 22 of the adsorption filter 1. An annular housing section 25 of the housing 22, the first filter insert 23, and the second filter insert 27, define an adsorption chamber 28 which is completely or partly filled with an adsorption medium 31, activated carbon for example. The adsorption chamber 28 is linked to the first reservoir 26 by means of the gas permeable first filter insert 23.

The filter line 8 which links the fuel tank 2 with the adsorption filter 1 is passed through the housing cover 21 by means of a filter connection 32 and is tightly connected to the housing cover 21. The first stowage chamber 26 is penetrated through its entire axial extent by the filter line 8. In the further progression, the filter line 8 penetrates the first filter insert 23 through an aperture 33 and terminates, for example, in the adsorption chamber 28 which is filled with activated carbon. The fuel tank 2 and the adsorption chamber 28 are thus directly linked by the filter line 8.

A gastight dividing wall 36 penetrates the inner cross-section of the housing 22 on that face of the second filter insert 27 which faces away from the adsorption chamber 28, and is closely connected with the housing 22. A second reservoir 37 is defined by a housing section 29 of the housing 22, the second filter insert 27, and the dividing wall 36. The first reservoir 26, the adsorption chamber 28, and the second reservoir 37 are connected with one another by the first filter insert 23 and the second filter insert 27 in a manner to allow gas permeance.

The dividing wall 36 and an annular end section 30 of the housing 22 form a pot shaped filter chamber 38, open to the atmosphere, which is completely covered by a fine porous particle filter 41 at the end opposite the dividing wall 36. The particle filter 41 thus extends over the entire inner cross-section of the housing 22 and separates the filter chamber 38 from the atmosphere in a manner to allow gas permeance, and is able to filter out the finest dirt particles from the atmosphere. An inner wall 39 encloses the inner cross-section of the housing 22 so that the particle filter 41 extends at least over the clearance width of the housing 22 which is defined by the inner wall 39. The particle filter 41 is thus designed with a large area transverse to the flow of the regenerating air, thereby effecting only a minor pressure drop of below 5 mbar in an air flow of approximately 3 m$^3$/h.

The housing cover 21, the housing 22, and the dividing wall 36 form a closed space which is linked to the outside by virtue of the suction line connection 20, the filter line connection 32, and a first breather line connection 42. The housing 22 has a second breather line connection 45, open to the filter chamber 38, which has the same angle coordinate with regard to the cylindrical housing 22 as the first breather line connection 42. One end each of a 'U' shaped breather line 46 is tightly inserted into the breather line connections 42, 45, so that the filter chamber 38 and the second reservoir 37 are linked to each other. The breather line 46 is sealed to the housing 22 by means of elastic sealing elements 47, 48, e.g. 'O' rings.

A shut-off valve 51, for example an electromagnetically operated valve, controls the breather line 46. In this arrangement, an upper short feed pipe 52 of the shut-off valve 51, which is inserted into the first breather line connection 42, and a lower short feed pipe 53 of the shut-off valve, which is inserted into the second breather line connection 45, form sections of the breather line 46. To avoid pressure, which has been generated by fuel vapour due to inadvertent or faulty closure of the tank breather valve 3 and the shut-off valve 51, bursting open the fuel tank 2, the filter line 8, the suction line 16 or the housing 22 of the adsorption filter 1, it must be possible to force open the shut-off valve 51 by pressure. For this purpose, the magnetic circuit 54 of the shut-off valve 51 must be designed so that at a predetermined pressure in the adsorption filter 1, for example 0.3 bar, the pressure which thereby acts on a valve closing part 55—which on excitation of the magnetic circuit 54 is moved into the closing position of the shut-off valve 51—is sufficient to move the valve closing part 55, in opposition to the magnetic force, into the opening position of the shut-off valve. Thus, the shut-off valve 51, as shown in FIG. 1, may be designed with a valve closing part 55, which in the non-energized state of the magnetic circuit 54 is moved by a return spring 49 into the opening position in the direction towards the lower short feed pipe 53, which is connected with the filter chamber 38, i.e. lifted off a valve seat 50 which lies in the direction of the upper short feed pipe 52. When the magnetic circuit 54 is energized, the valve closing part 55 is pushed to the valve seat 50 in the direction towards the upper short feed pipe 52 with just sufficient force to allow a force generated by a pressure of approximately 0.3 bar in the adsorption filter 1, to move the valve closing part 55 in opposition to the magnetic force, away from the valve seat 50 in the direction to the lower short feed pipe 53. The now open shut-off valve 51 allows the pressure in the adsorption filter 1 and in the fuel tank 2 to be reduced. The shut-off valve 51 can be designed, in a manner not shown, with a valve closing part which in the energized state of the magnetic circuit can be moved in opposition to the force of a return spring in the direction from the upper short feed pipe 52 to the lower short feed pipe 53, during which action it will come to rest on the valve seat until a force in the adsorption filter, generated by a pressure of approximately 0.3 bar, which impinges on the valve closing part, lifts the valve closing part, in opposition to the magnetic force, off the valve seat and facilitates a pressure relief as described above. In the non-energized state of the magnetic circuit, the valve closing part is moved by the return spring in the direction of the upper short feed pipe 52, i.e. away from the valve seat, into the opening position of the shut-off valve.

In the dashed line representation in FIG. 1, a shut-off valve 51' is also shown, which is arranged within the filter chamber 38 which is identical to the shut-off valve 51 in terms of function and structure. The breather connections 42 and 45 in the housing are closed. The breather connection 42' penetrates the dividing wall 36 and is connected to the obliquely upwards extending upper short feed pipe 52' of the shut-off valve 51'. A lower short feed pipe cam be dispensed with in the shut-off valve 51', since the vertically arranged shut-off valve 51' can be open to the bottom in the direction of the particle filter 41. The shut-off valve 51 thus takes on the additional function of a safety valve.

The shut-off valve 51 is open in the non-energized state in order to avoid a pressure rise in the fuel tank 2 in the event of power failure, for example after an accident. Opening of the shut-off valve 51 in the non-energized state is accomplished in the known manner, for example by the return spring 49.

In order to prevent condensate entering into the live components, e.g. in a magnetic circuit 54 with magnetic coil and core of the shut-off valve 51, the shut-off valve 51 is aligned such that the magnetic circuit 54 is arranged at the highest gravitational point of the shut-off valve 51. The discharge of condensate from the reservoir 37, the breather line 46, and the shut-off valve 51 in the direction of the atmosphere, is enhanced by virtue of the fact that the valve closing part 55 performs a vertical opening and closing movement along a vertical axis 56 and that the valve seat 50 is concentric with this vertical axis 56. The magnetic circuit 54 then lies above the valve seat 50 and also above the upper short feed pipe 52, or above the air route in the shut-off valve 51 from the upper short feed pipe 52 to the valve seat 50. A downward incline of the short feed pipes 52 and 53, as shown for the upper short feed pipe 52' of the shut-off valve 51', additionally enhances the condensate discharge.

If portions of the fuel evaporate, they pass through the filter line 8 into the adsorption chamber 28 of the adsorption filter 1 from where they are drawn off through the suction line 16 into the manifold 13, with the tank breather valve 3 open, due to the load dependent negative pressure which prevails in the induction manifold 13 of the running engine, and are fed to the internal combustion engine for burning. With the tank breather valve 3 closed, or in the event of an insufficient negative pressure in the induction manifold 13, the fuel vapour which escapes from the fuel tank 2 are stored by the activated carbon in the adsorption chamber 28 of the adsorption filter 1. When the tank breather valve 3 is again opened or when the pressure in the induction manifold 13 reduces, fresh air is drawn from the atmosphere via the particle filter 41, through the adsorption filter 1, and regenerates the activated carbon in the adsorption chamber 28 of the adsorption filter 1. The portion of the fuel vapour which is retained in the activated carbon is taken up and fed through the suction line 16 to the engine, for burning.

In order to prevent contamination of the adsorption filter 1, in particular of the shut-off valve 51, the air which flows from the atmosphere into the adsorption filter 1, is first purged of any impurities, such as dust, by the particle filter 41. Due to the particle filter 41, the fresh air flow encounters a pressure drop which propagates as negative pressure directly into the fuel tank where it unintentionally increases the rate of fuel evaporation. In order to further reduce the emission of fuel vapour, a fuel hose nozzle which seals against the filler neck 6 can be used for filling. In this case, the fuel vapour is displaced by the adsorption filter 1 and causes, among other things, a pressure drop at the particle filter 41, which leads to a pressure rise at the fuel hose nozzle which on reaching a definite value, unintentionally triggers the automatic shut-off mechanism of the filler nozzle.

In addition to the pore size, the cross-sectional area of the particle filter 41 decisively influences the pressure drop caused on the particle filter 41. In order to achieve an adequate purification of the fresh air drawn in, a very small pore size must be selected, i.e. a small-pore particle filter 41, which causes the pressure drop to considerably intensify. This undesirable side effect can be compensated for by a large cross-sectional area, so that the risk of an unintentional triggering of the shut-off mechanism of the filler nozzle, and the increase in the rate of evaporation of the fuel in the fuel tank 2 is reduced. The particle filter 41 thereby obtains a large cross-sectional area with a pressure drop of an acceptable size, so that the particle filter 41 extends at least over the entire inner cross-section of the housing 22.

In order to check the sealing efficiency of the breather, the shut-off valve 51 or 51' is closed. Due to the negative pressure which exists in the induction manifold, a negative pressure will occur in the fuel tank 2, the filter line 8, the adsorption filter 1, and the suction line 16. The tank breather valve 3 is then closed.

If the fuel tank 2, the filter line 8, the adsorption filter 1, the suction line 16, the tank breather valve 3, and the shut-off valve 51 or 51', and all connections of the above named component are free from any leak, the negative pressure will be maintained. The pressure is ascertained by a pressure sensor 80, which is arranged for example on the adsorption filter 1 and projects into one of the chambers 26, 28, or 37. The pressure sensor 80, the tank breather valve 3, and the shut-off valve 51 or 51' are connected to an electronic control unit 81. If there is a leak in one of these components or in a connection, then air will flow in the direction of the negative pressure regions and cause pressure compensation, so that the negative pressure can be maintained only over a short period and the pressure sensor 80 transmits a varying signal to the control unit 81.

Of particular importance in this context is tight closing of both the shut-off valve 51 and of the tank breather valve 3. Should one of the named valves fail to close completely, air will enter into the shut-off chamber via the leaking valve. It is then no longer possible to state with confidence to what extent the system has become leaky or whether the air is entering through an insufficiently closing valve. The shut-off valve 51, through which the fresh air, which regenerates the adsorption filter 1, flows first, is particularly susceptible. It is here that there is a particularly high risk that contaminations of the air will deposit in the shut-off valve 51 and prevent a completely tight closure. The particle filter 41, which has a large area, is integrated in the housing 22 and covers the inner cross-section, prevents contamination of the shut-off valve 51, without impairing the general function of the breather due to an excessive pressure drop of the fresh air which flows through it.

Instead of being arranged somewhere in the suction line 16, the tank breather valve may alternatively be arranged at the start of the suction line 16, i.e. directly on or in the adsorption filter 1, as shown by the tank breather valve 3' represented by a dashed line. The arrangement of individual or of all components, such as shut-off valve, tank breather valve, pressure sensor, and particle filter on or in the adsorption filter provides a very compact assembly which only requires to be connected to the fuel tank and the induction manifold on the motor vehicle.

Figure 2:
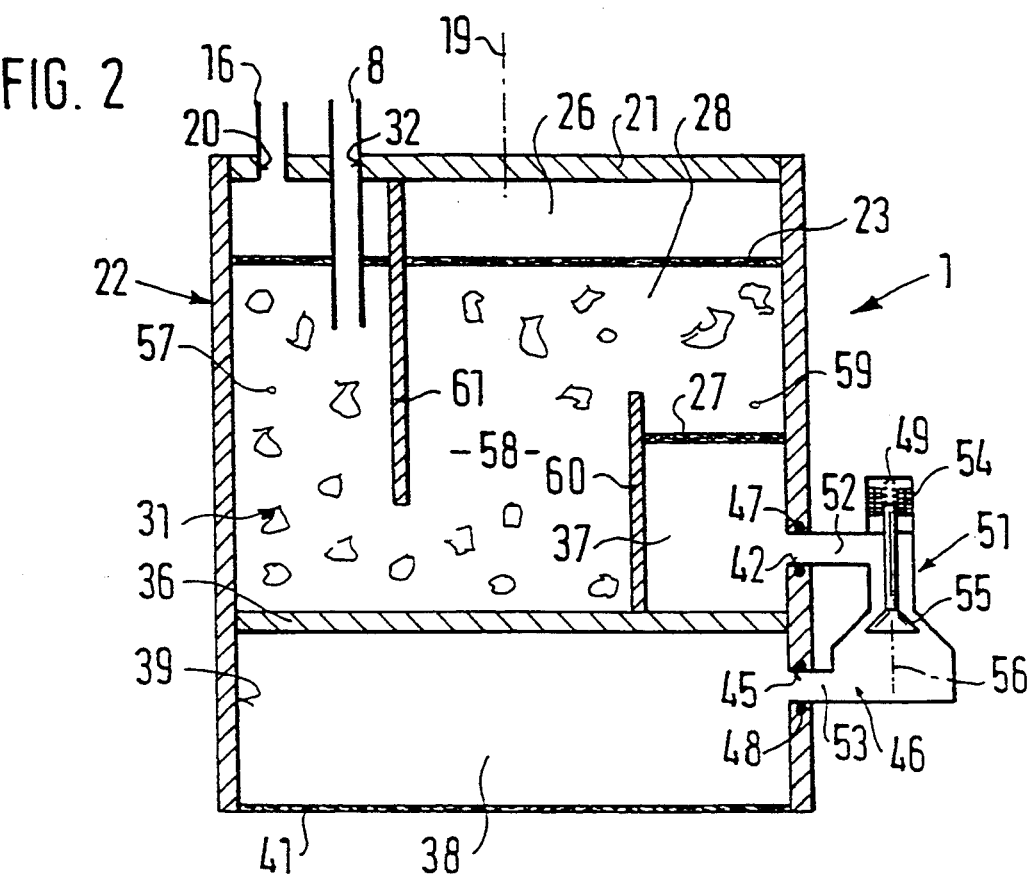
FIG. 2 shows a second embodiment example of a breather, in part, which is designed in accordance with the invention.
Figure 3:
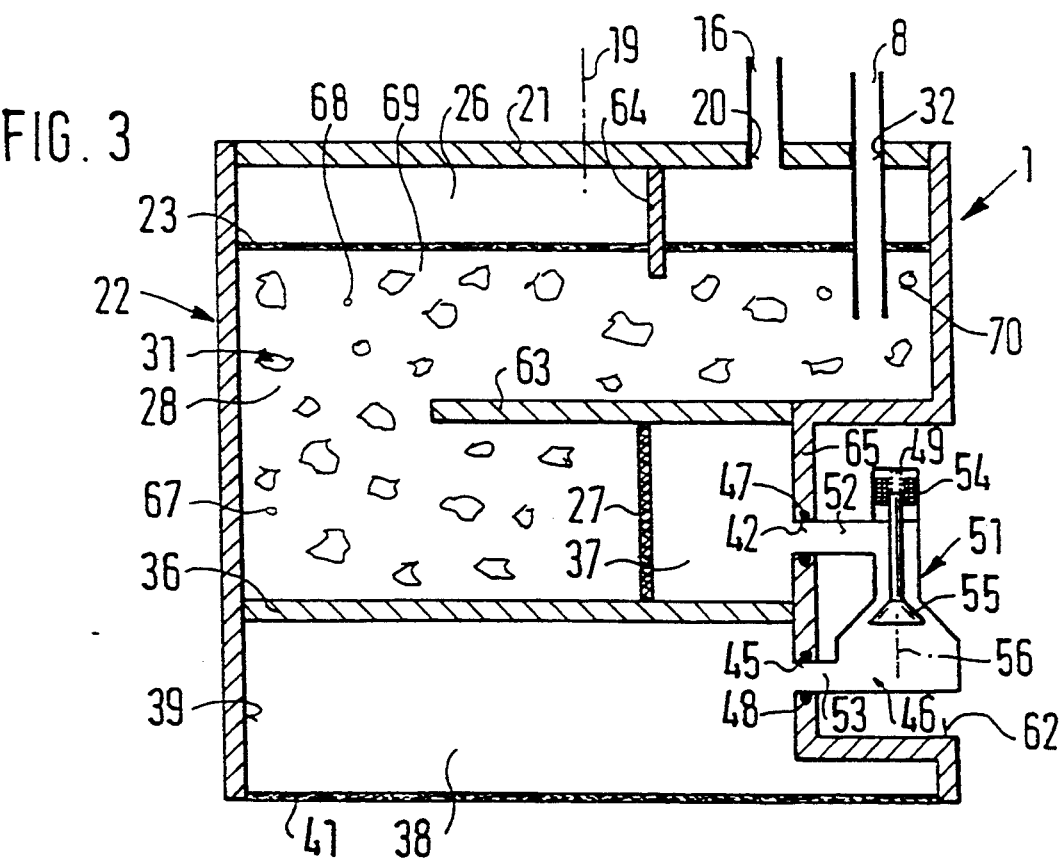
FIG. 3 shows a third embodiment example of a breather, in part, which is designed in accordance with the invention.

FIGS. 2 and 3 show two further embodiment examples of a breather designed in accordance with the invention, with an adsorption filter for a fuel tank, in which the tank, the tank breather valve, and the induction manifold have been omitted. Components which are identical in relation to the embodiment example in FIG. 1 and which are of identical action are identified by the same reference symbols. The adsorption filter 1 shown in FIG. 2 has a first reservoir 26 which is separated from the adsorption chamber 28 by the first filter insert 23, and a second reservoir 37 which, differing from the embodiment example shown in FIG. 1, is separated from the adsorption chamber 28 which is at least partly filled with the adsorption medium 31, by the second filter insert 27 and a first baffle 60. The second reservoir extends only partially over the entire inner cross-section of the housing 22. For this arrangement, the first baffle 60, starting from the dividing wall 36, extends for example in the longitudinal direction of the inner wall 39 of the housing 22 and vertically in relation to the dividing wall 36, partly into the adsorption chamber 28, and terminates with a separation from the first filter insert 23, so that between the first baffle 60 and the first filter insert 23, a free cross-section remains. The first baffle 60 then is at a small separation from the right inner wall 39, for example, of the housing 22.

At a lateral separation from the first baffle 60, away from the right-hand inner wall 39 and starting from the housing cover 21, for example at right angles to the housing cover 21, a second baffle 61 projects partly into the adsorption chamber 28, at least as far as into the adsorption medium 31. A cross-section remains free between that end of the second baffle 61 which faces the dividing wall 36. Two parallel baffles 60, 61 divide the adsorption chamber 28 into three chambers, two of which, namely 57, 58 are of approximately equal size, and one, 59, is smaller by the volume of the reservoir 37, these chambers are interconnected by the cross-sections which remain free between the first baffle 60 and the first filter insert 23 and the second baffle 61 and the dividing wall 36. The smaller right-hand chamber 59 is connected to the first reservoir 26 so as to permit gas permeance, by means of the first filter insert 23, and to the second reservoir 37 by means of the second filter insert 27.

The suction line connection 20 and the filter line connection 32 are arranged in that region of the housing cover 21 which partly defines the left-hand chamber 57, so that the maximum distance possible lies between the entry of the fresh air at the second filter insert 27 and the suction line connection 20, thus providing air flow around much of the adsorption medium 31.

The shut-off valve 51 already described for the embodiment example in FIG. 1 is inserted with the short feed pipes 52 and 53 into the breather line connections 42 and 45 in the manner described there, so that a connection can be made between the filter chamber 38, which is defined by the large area particle filter 41, and the second reservoir 37.

Deviating from the adsorption filter in the FIGS. 1 and 2, the housing 22 of the adsorption filter 1 in accordance with FIG. 3 has a lateral recess 62, which is of such a size as to accommodate the shut-off valve 51 and the vent line 46, without projecting beyond the outline of the housing 22. In a longitudinal wall 65 of the recess 62, which is parallel to the inner wall 39 of the housing 22, two breather line connections 42 to the second reservoir 37 and 45 to the filter chamber 38 are arranged, into which the short feed pipes 52 and 53 of the breather line 46 are inserted. Arranged between the dividing wall 36 and the first filter insert 23 and extending parallel with these is a lower baffle 63, which starts from the inner wall 39 at the recess 62 and projects into the adsorption chamber 28 with a separation from the first filter insert 23. This baffle does not, however, extend over the entire cross-section of the housing 22 up to the inner wall 39 opposite. A cross-section remains free between the end of the lower baffle 63, which lies in the adsorption chamber 28, and the inner wall 39 of the housing 22.

The lower baffle 63 divides the adsorption chamber 28 into a lower chamber 67 at the dividing wall 36 and an upper chamber 68 at the first filter insert 23. The second filter insert 27 is arranged with a lateral separation from the longitudinal wall 65 of the recess 62 between the lower baffle 63 and the dividing wall 36; the filter insert 27, together with this dividing wall 36, the lower baffle 63, and the housing 22, defines the second reservoir 37. An upper baffle 64 extends from the housing cover 21 and projects partly into the adsorption chamber 28, certainly at least into the adsorption medium 31, and divides the upper chamber 68 into a left-hand chamber 69 and a right-hand chamber 70. The suction line connection 20 and the filter line connection 32 are arranged in that region of the housing cover 21 which lies above the right-hand chamber 70. The upper baffle 64 terminates above the lower baffle 63, leaving a vertical free cross-section between the upper baffle 64 and the lower baffle 63, via which a gas exchange can take place between the chambers 69 and 70. In this way, the maximum path length is achieved and air flow around much of the adsorption medium 31 is ensured between the entry off fresh air into the second reservoir 37 and the suction line connection 20. The shut-off valve 51, inserted into the breather line connections 42 and 45 of the recess 62 by means of the short feed pipes 52 and 53, is enclosed in the contour of the housing 22 and is thus better protected from damage.

The foregoing relates to a preferred exemplary embodiment of the invention, it being understood that other variants and embodiments thereof are possible within the spirit and scope of the invention, the latter being defined by the appended claims.

We claim:

1. A breather for a fuel tank of an internal combustion engine having a housing, an adsorption filter in said housing, said housing is linked by means of a suction line to an induction manifold of the internal combustion engine and, a filter line between said housing and the fuel tank and a breather line connected with said housing and to the atmosphere, a shut-off valve in said breather line which can shut off said breather line, said shut-off valve having a valve seat and a valve closing body, the shut-off valve (51, 51') is provided with a magnetic circuit (54) which when energized moves the valve closing body (55) into the closing position and which is designed to be only of such power that above a certain pressure in the adsorption filter (1), the force produced thereby is sufficient to move the valve closing body (55) into the opening position.

2. A device in accordance with claim 1, in which the shut-off valve (51, 51') has a vertical axis and that the valve closing body (55) of the shut-off valve (51, 51') is arranged to be movable along the vertical axis (56), so that any condensate which may have formed can readily flow off downward when the valve closing body (55) has lifted off its seat (50).

3. A device in accordance with claim 2, in which the shut-off valve (51, 51') is operated by means of a magnetic circuit (54) and that the magnetic circuit (54) is arranged above an air path by means of the shut-off valve (51, 51').

4. A device in accordance with claim 2, in which the shut-off valve (51, 51') has short feed pipes (52, 53) for supplying air or discharging air, and that at least one of the short feed pipes (52, 53) extends at an incline toward the valve closing body (55).

5. A device in accordance with claim 3, in which the shut-off valve (51, 51') has short feed pipes (52, 53) for supplying air or discharging air, and that at least one of the short feed pipes (52, 53) extends at an incline toward the valve closing body (55).

6. A device in accordance with claim 2, in which the shut-off valve (51) can be inserted, gastight, by means of short feed pipes (52, 53) into breather line connections (42, 45) of the housing (22).

7. A device in accordance with claim 3, in which the shutoff valve (51) can be inserted, gastight, by means of short feed pipes (52, 53) into breather line connections (42, 45) of the housing (22).

8. A device in accordance with claim 1, in which the breather line (46) extends at least partly outside the housing (22) and that the shut-off valve (51) is arranged outside the housing (22).

9. A device in accordance with claim 8, in which the shut-off valve (51) is arranged in a recess (62) of the housing (22).

10. A device in accordance with claim 8, in which the shut-off valve (51) forms a compact assembly with the housing (22) of the adsorption filter (1).

11. A device in accordance with claim 1, in which a particle filter (41) is arranged on the housing (22) of the adsorption filter (1) and is designed with a large surface area, so that the particle filter causes only a minor pressure drop in the adsorption filter (1).

12. A device in accordance with claim 11, in which the particle filter (41) forms an outer wall of the housing (22) and links a filter chamber (38) in the housing (22) with the atmosphere in a manner to allow gas permeance.

13. A device in accordance with claim 12, in which the particle filter (41) extends over an inner cross-section of the housing (22) which extends at right angles to a longitudinal axis (19) of the housing.

14. A device in accordance with claim 12, in which the filter chamber (38) is separated by a dividing wall (36) from a reservoir (37) which is connected to an adsorption chamber (28) in the housing (22) which accommodates an adsorption medium (31), and the filter chamber (38) is connected to the reservoir (37) by means of the breather line (46).

15. A device in accordance with claim 13, in which the filter chamber (38) is separated by a dividing wall (36) from a reservoir (37) which is connected to an adsorption chamber (28) in the housing (22) which accommodates an adsorption medium (31), and the filter chamber (38) is connected to the reservoir (37) by means of the breather line (46).

16. A device in accordance with claim 12, in which a dividing wall (36) separates the filter chamber (38) from an adsorption chamber (28), which accommodates the adsorption medium (31), in the housing (22) and is linked to the adsorption chamber by means of the breather line (46).

17. A device in accordance with claim 13, in which a dividing wall (36) separates the filter chamber (38) from an adsorption chamber (28), which accommodates the adsorption medium (31), in the housing (22) and is linked to the adsorption chamber by means of the breather line (46).

18. A device in accordance with claim 14, in which the adsorption chamber (28) is divided into chambers (57, 58, 59; 67, 68, 69, 70) by at least one baffle (60, 61; 63, 64) which deflects the air flow.

19. A device in accordance with claim 15, in which the adsorption chamber (28) is divided into chambers (57, 58, 59; 67, 68, 69, 70) by at least one baffle (60, 61; 63, 64) which deflects the air flow.

20. A device in accordance with claim 16, in which the adsorption chamber (28) is divided into chambers (57, 58, 59; 67, 68, 69, 70) by at least one baffle (60, 61; 63, 64) which deflects the air flow.

21. A device in accordance with claim 17, in which the adsorption chamber (28) is divided into chambers (57, 58, 59; 67, 68, 69, 70) by at least one baffle (60, 61; 63, 64) which deflects the air flow.

22. A device in accordance with claim 1, in which a sensor (80) projects into a pressure chamber of the adsorption filter (1).

23. A device in accordance with claim 1, in which a tank breather valve (3) is installed in the suction line (16).

* * * * *